No. 881,753. PATENTED MAR. 10, 1908.
E. A. WHITEHOUSE.
EXCREMENT SACK FOR DOMESTIC ANIMALS.
APPLICATION FILED DEC. 2, 1907.
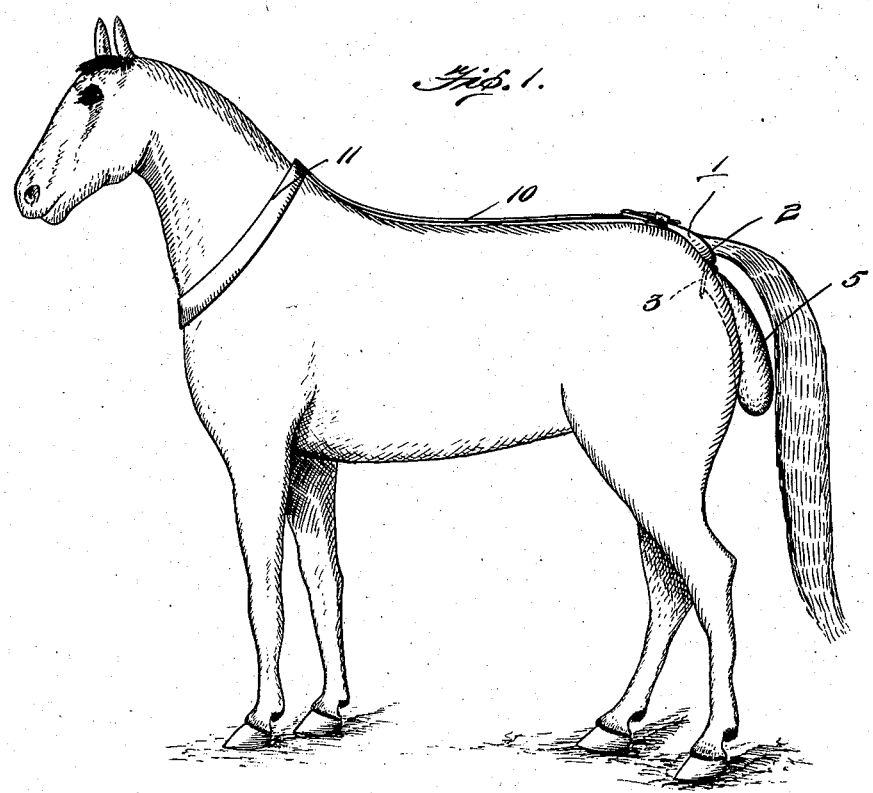
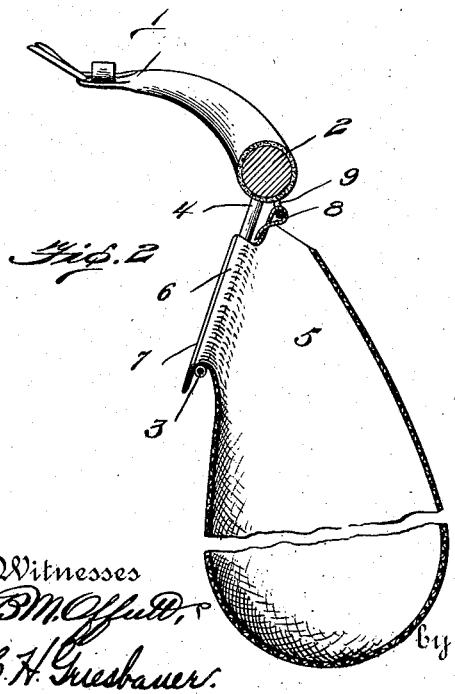
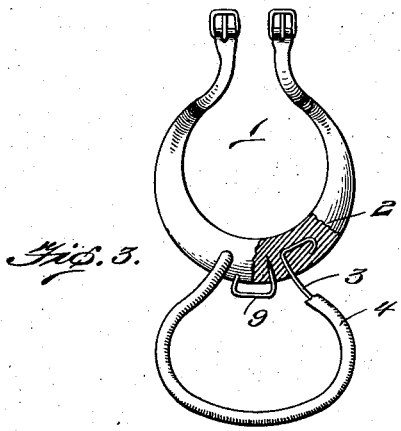
Inventor
E. A. Whitehouse

UNITED STATES PATENT OFFICE.

EDWARD A. WHITEHOUSE, OF NEWARK, NEW JERSEY.

EXCREMENT-SACK FOR DOMESTIC ANIMALS.

No. 881,753.    Specification of Letters Patent.    Patented March 10, 1908.

Application filed December 2, 1907. Serial No. 404,715.

*To all whom it may concern:*

Be it known that I, EDWARD A. WHITE-HOUSE, a citizen of the United States, residing at Newark, in the county of Essex and State of New Jersey, have invented certain new and useful Improvements in Excrement-Sacks for Domestic Animals; and I do declare the following to be a full, clear, and exact description of the invention, such as will enable others skilled in the art to which it appertains to make and use the same.

This invention has relation to new and useful improvements in excrement sacks for domestic animals, and has for its principal object to provide means for detachably supporting a sack or other receptacle in position to receive the excrement or waste matter of horses or other domestic animals at the time of the discharge or excretion, so that highways, stables or the like may be kept clean and the excrement or waste matter easily and conveniently handled, without danger of soiling the hands.

With the foregoing and other objects in view that will readily appear as the nature of the invention is better understood, the same resides in the novel features of construction, combination and arrangement of parts illustrated in the drawings and particularly pointed out in the appended claims.

In the accompanying drawings:—Figure 1 is a view illustrating the application of the invention, Fig. 2 is a central longitudinal section, taken through the sack, the crupper and the sack supporting means; and Fig. 3 is a detail perspective view of the crupper and sack attaching means.

In carrying out the invention the crupper 1, which may be of any common or approved form, is provided at its body portion 2, or that portion which fits under the tail of the animal to which it is to be attached, with a loop 3, of wire or other suitable material covered by a tubing 4, of rubber or other suitable material, said loop extending from the crupper at a suitable angle and being designed to fit or encircle the anus of the horse or other animal. The sack or receptacle 5 for receiving and collecting the excrement is made from rubber, water proof paper, or other suitable material and is formed near one end with an inlet opening 6 to correspond with the diameter of the loop 3. A flap 7 is arranged at the edge of the opening and extends for a suitable distance around the same, said flap being adapted to be folded over a corresponding portion of the loop, and possessing sufficient stiffness or rigidity to retain itself in position. A strap 8, of leather or other suitable material is attached to the open end of the sack or receptacle, and is adapted for insertion through a loop 9 suitably attached to the body portion of the crupper, at a point above the loop 3, and thence through a corresponding slit in the open end of the sack. In practice, the crupper may be held in position by a back strap 10, preferably connected at its forward end to a collar 11 arranged around the neck of the animal.

By employing an excrement sack and arranging it in position in the manner shown, highways, stable floors, pastures, or other places where horses or other domestic animals frequent, may be kept free or clean of any excrement, and the obnoxious odor emanating from the same in stables or like places materially diminished. The excrement is also kept free from straw, saw dust or the like, and its value as a fertilizer greatly enhanced. The excrement may also be easily handled without danger of soiling the hands.

Having thus described the invention, I claim:

1. In a device of the character specified, the combination with a supporting loop designed to encircle the anus of an animal and supporting means for the loop, of a flexible tubing, incasing the loop, and an excrement collecting receptacle suspended beneath and from the loop.

2. In a device of the character specified, the combination with a crupper and supporting means therefor, of an inwardly inclined downwardly extending supporting loop attached to the body of the crupper in position to encircle the anus of an animal, a flexible tubing incasing the loop and an excrement collecting receptacle, suspended beneath and from the supporting loop.

3. In a device of the character specified, the combination with a supporting loop designed to encircle the anus of an animal, and supporting means for the loop of an excrement collecting receptacle formed with an inlet opening to correspond with the outline of the loop, suspended beneath the same and a retaining flap arranged at the edge of the inlet opening of the receptacle and foldable over the supporting loop.

4. In a device of the character specified, the combination with a crupper and supporting means therefor, of a supporting loop attached to the body of the crupper in position to encircle the anus of an animal, an excrement collecting receptacle formed with an inlet opening to correspond with the outline of the loop, suspended beneath the same and a retaining flap arranged at the edge of the inlet opening of the receptacle and foldable over the supporting loop.

5. In a device of the character specified, the combination with a crupper and supporting means therefor, of an inwardly inclined downwardly extending supporting loop attached to the body of the crupper in position to encircle the anus of an animal, an outwardly inclined downwardly extending supporting loop attached to the body of the crupper at a point opposite the inwardly inclined supporting loop, an excrement collecting receptacle formed with an inlet opening to correspond with the first mentioned loop, a retaining flap, arranged at the edge of said inlet opening and foldable over the first mentioned loop and a retaining strap attached to the inlet end of the receptacle and insertible through the second mentioned loop.

6. In a device of the character specified, the combination with a crupper and supporting means therefor, of an excrement collecting receptacle formed with an inlet opening to fit the anus of an animal and supporting means for the receptacle, said means comprising a downwardly extending loop attached to the body of the crupper and a retaining strap attached to the inlet end of the receptacle and insertible through said loop.

In testimony whereof I have hereunto set my hand in presence of two subscribing witnesses.

EDWARD A. WHITEHOUSE.

Witnesses:
   EDWARD WHITEHOUSE, Jr.,
   SAMUEL E. AYERS.